United States Patent

Ruan

(10) Patent No.: US 9,230,585 B1
(45) Date of Patent: Jan. 5, 2016

(54) PER WEDGE PREHEAT DFH TO IMPROVE DATA STORAGE DEVICE PERFORMANCE

(71) Applicant: Western Digital Technologies, Inc., Irvine, CA (US)

(72) Inventor: Huanxiang Ruan, Irvine, CA (US)

(73) Assignee: Western Digital Technologies, Inc., Irvine, CA (US)

(*) Notice: Subject to any disclaimer, the term of this patent is extended or adjusted under 35 U.S.C. 154(b) by 0 days.

(21) Appl. No.: 14/169,514

(22) Filed: Jan. 31, 2014

(51) Int. Cl.
*G11B 21/02* (2006.01)
*G11B 27/36* (2006.01)
*G11B 5/60* (2006.01)
*G11B 5/55* (2006.01)
*G11B 5/596* (2006.01)

(52) U.S. Cl.
CPC ........... *G11B 5/607* (2013.01); *G11B 5/6011* (2013.01); *G11B 5/5521* (2013.01); *G11B 5/596* (2013.01); *G11B 5/6029* (2013.01)

(58) Field of Classification Search
None
See application file for complete search history.

(56) References Cited

U.S. PATENT DOCUMENTS

| | | | |
|---|---|---|---|
| 6,018,789 A | 1/2000 | Sokolov et al. | |
| 6,065,095 A | 5/2000 | Sokolov et al. | |
| 6,078,452 A | 6/2000 | Kittilson et al. | |
| 6,081,447 A | 6/2000 | Lofgren et al. | |
| 6,092,149 A | 7/2000 | Hicken et al. | |
| 6,092,150 A | 7/2000 | Sokolov et al. | |
| 6,094,707 A | 7/2000 | Sokolov et al. | |
| 6,105,104 A | 8/2000 | Guttmann et al. | |
| 6,111,717 A | 8/2000 | Cloke et al. | |
| 6,145,052 A | 11/2000 | Howe et al. | |
| 6,175,893 B1 | 1/2001 | D'Souza et al. | |
| 6,178,056 B1 | 1/2001 | Cloke et al. | |
| 6,191,909 B1 | 2/2001 | Cloke et al. | |
| 6,195,218 B1 | 2/2001 | Guttmann et al. | |
| 6,205,494 B1 | 3/2001 | Williams | |
| 6,208,477 B1 | 3/2001 | Cloke et al. | |
| 6,223,303 B1 | 4/2001 | Billings et al. | |
| 6,230,233 B1 | 5/2001 | Lofgren et al. | |
| 6,246,346 B1 | 6/2001 | Cloke et al. | |
| 6,249,393 B1 | 6/2001 | Billings et al. | |
| 6,256,695 B1 | 7/2001 | Williams | |
| 6,262,857 B1 | 7/2001 | Hull et al. | |
| 6,263,459 B1 | 7/2001 | Schibilla | |
| 6,272,694 B1 | 8/2001 | Weaver et al. | |
| 6,278,568 B1 | 8/2001 | Cloke et al. | |
| 6,279,089 B1 | 8/2001 | Schibilla et al. | |
| 6,289,484 B1 | 9/2001 | Rothberg et al. | |

(Continued)

OTHER PUBLICATIONS

Bernhard E. Knigge, et al. U.S. Appl. No. 13/922,417, filed Jun. 20, 2013, 22 pages.

(Continued)

*Primary Examiner* — Andrew L Sniezek (57) ABSTRACT

A disk drive is disclosed including a disk having a plurality of tracks, wherein each track comprises a plurality of data sectors and a plurality of servo sectors. The disk drive further comprises a spindle motor for rotating the disk, and a head actuated radially over the disk, wherein the head comprises a dynamic fly height (DFH) heater. Control circuitry within the disk drive is operable to position the head over one of the tracks; determine a number of servo sectors to pass under the head before a target location over the track is reached, apply an initial amount of power to the DFH heater that is dependent at least in part on the determined number of servo sectors, and decrease the initially-applied amount of power applied to the DFH heater until a predetermined target power is reached.

16 Claims, 3 Drawing Sheets

(56) References Cited

U.S. PATENT DOCUMENTS

| | | |
|---|---|---|
| 6,292,912 B1 | 9/2001 | Cloke et al. |
| 6,310,740 B1 | 10/2001 | Dunbar et al. |
| 6,317,850 B1 | 11/2001 | Rothberg |
| 6,327,106 B1 | 12/2001 | Rothberg |
| 6,337,778 B1 | 1/2002 | Gagne |
| 6,369,969 B1 | 4/2002 | Christiansen et al. |
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,417,981 B1 | 7/2002 | Smith |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,499,083 B1 | 12/2002 | Hamlin |
| 6,519,104 B1 | 2/2003 | Cloke et al. |
| 6,525,892 B1 | 2/2003 | Dunbar et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,700,724 B2 | 3/2004 | Riddering et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,402 B1 | 6/2004 | Elliott et al. |
| 6,757,481 B1 | 6/2004 | Nazarian et al. |
| 6,772,281 B2 | 8/2004 | Hamlin |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,801,376 B2 | 10/2004 | Smith |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,883,368 B2 | 4/2005 | Smith et al. |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,894,854 B1 | 5/2005 | Carlson et al. |
| 6,895,455 B1 | 5/2005 | Rothberg |
| 6,895,500 B1 | 5/2005 | Rothberg |
| 6,898,730 B1 | 5/2005 | Hanan |
| 6,910,099 B1 | 6/2005 | Wang et al. |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,948,165 B1 | 9/2005 | Luu et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,983,316 B1 | 1/2006 | Milne et al. |
| 6,986,007 B1 | 1/2006 | Procyk et al. |
| 6,986,154 B1 | 1/2006 | Price et al. |
| 6,995,933 B1 | 2/2006 | Codilian et al. |
| 6,996,501 B1 | 2/2006 | Rothberg |
| 6,996,669 B1 | 2/2006 | Dang et al. |
| 7,002,926 B1 | 2/2006 | Eneboe et al. |
| 7,003,674 B1 | 2/2006 | Hamlin |
| 7,006,316 B1 | 2/2006 | Sargenti, Jr. et al. |
| 7,009,820 B1 | 3/2006 | Hogg |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,716 B1 | 4/2006 | Boyle et al. |
| 7,028,174 B1 | 4/2006 | Atai-Azimi et al. |
| 7,031,902 B1 | 4/2006 | Catiller |
| 7,046,465 B1 | 5/2006 | Kupferman |

(56) References Cited

U.S. PATENT DOCUMENTS

| | | |
|---|---|---|
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |
| 7,055,167 B1 | 5/2006 | Masters |
| 7,057,836 B1 | 6/2006 | Kupferman |
| 7,062,398 B1 | 6/2006 | Rothberg |
| 7,068,449 B2 | 6/2006 | Riddering et al. |
| 7,075,746 B1 | 7/2006 | Kupferman |
| 7,076,604 B1 | 7/2006 | Thelin |
| 7,082,494 B1 | 7/2006 | Thelin et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,106,537 B1 | 9/2006 | Bennett |
| 7,106,947 B2 | 9/2006 | Boyle et al. |
| 7,110,202 B1 | 9/2006 | Vasquez |
| 7,111,116 B1 | 9/2006 | Boyle et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,171,108 B1 | 1/2007 | Masters et al. |
| 7,171,110 B1 | 1/2007 | Wilshire |
| 7,180,692 B1 | 2/2007 | Che et al. |
| 7,194,576 B1 | 3/2007 | Boyle |
| 7,200,698 B1 | 4/2007 | Rothberg |
| 7,205,805 B1 | 4/2007 | Bennett |
| 7,206,497 B1 | 4/2007 | Boyle et al. |
| 7,215,496 B1 | 5/2007 | Kupferman et al. |
| 7,215,771 B1 | 5/2007 | Hamlin |
| 7,237,054 B1 | 6/2007 | Cain et al. |
| 7,239,471 B2 | 7/2007 | Tanabe |
| 7,240,161 B1 | 7/2007 | Boyle |
| 7,249,365 B1 | 7/2007 | Price et al. |
| 7,263,709 B1 | 8/2007 | Krapf |
| 7,274,639 B1 | 9/2007 | Codilian et al. |
| 7,274,659 B2 | 9/2007 | Hospodor |
| 7,275,116 B1 | 9/2007 | Hanmann et al. |
| 7,277,251 B2 | 10/2007 | Ishii et al. |
| 7,280,302 B1 | 10/2007 | Masiewicz |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,323 B1 | 2/2008 | Singh et al. |
| 7,346,790 B1 | 3/2008 | Klein |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,375,914 B1 * | 5/2008 | Dieron et al. .................. 360/75 |
| 7,380,147 B1 | 5/2008 | Sun |
| 7,392,340 B1 | 6/2008 | Dang et al. |
| 7,404,013 B1 | 7/2008 | Masiewicz |
| 7,406,545 B1 | 7/2008 | Rothberg et al. |
| 7,415,571 B1 | 8/2008 | Hanan |
| 7,430,090 B2 | 9/2008 | Oyamada et al. |
| 7,436,610 B1 | 10/2008 | Thelin |
| 7,436,620 B1 | 10/2008 | Kang et al. |
| 7,437,502 B1 | 10/2008 | Coker |
| 7,440,214 B1 | 10/2008 | Ell et al. |
| 7,440,219 B2 | 10/2008 | Zhu et al. |
| 7,451,344 B1 | 11/2008 | Rothberg |
| 7,457,072 B2 | 11/2008 | Dieron et al. |
| 7,471,483 B1 | 12/2008 | Ferris et al. |
| 7,471,486 B1 | 12/2008 | Coker et al. |
| 7,477,470 B2 | 1/2009 | Leis et al. |
| 7,486,060 B1 | 2/2009 | Bennett |
| 7,489,466 B2 | 2/2009 | Knigge et al. |
| 7,496,493 B1 | 2/2009 | Stevens |
| 7,508,617 B1 | 3/2009 | Mak et al. |
| 7,511,914 B2 | 3/2009 | Hiller et al. |
| 7,518,819 B1 | 4/2009 | Yu et al. |
| 7,526,184 B1 | 4/2009 | Parkinen et al. |
| 7,539,924 B1 | 5/2009 | Vasquez et al. |
| 7,543,117 B1 | 6/2009 | Hanan |
| 7,551,383 B1 | 6/2009 | Kupferman |
| 7,562,282 B1 | 7/2009 | Rothberg |
| 7,577,973 B1 | 8/2009 | Kapner, III et al. |
| 7,596,797 B1 | 9/2009 | Kapner, III et al. |
| 7,599,139 B1 | 10/2009 | Bombet et al. |
| 7,619,841 B1 | 11/2009 | Kupferman |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,675,707 B1 | 3/2010 | Liu et al. |
| 7,688,540 B1 | 3/2010 | Mei et al. |
| 7,724,461 B1 | 5/2010 | McFadyen et al. |
| 7,725,584 B1 | 5/2010 | Hanmann et al. |
| 7,730,295 B1 | 6/2010 | Lee |
| 7,760,458 B1 | 7/2010 | Trinh |
| 7,768,776 B1 | 8/2010 | Szeremeta et al. |
| 7,787,201 B2 | 8/2010 | Alex |
| 7,804,657 B1 | 9/2010 | Hogg et al. |
| 7,808,738 B2 * | 10/2010 | Mitsunaga et al. ............. 360/75 |
| 7,813,954 B1 | 10/2010 | Price et al. |
| 7,827,320 B1 | 11/2010 | Stevens |
| 7,839,588 B1 | 11/2010 | Dang et al. |
| 7,839,595 B1 | 11/2010 | Chue et al. |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,898,756 B1 | 3/2011 | Wang |
| 7,898,762 B1 | 3/2011 | Guo et al. |
| 7,900,037 B1 | 3/2011 | Fallone et al. |
| 7,907,364 B2 | 3/2011 | Boyle et al. |
| 7,916,420 B1 | 3/2011 | McFadyen et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,949,564 B1 | 5/2011 | Hughes et al. |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,648 B1 | 8/2011 | Wang |
| 7,992,179 B1 | 8/2011 | Kapner, III et al. |
| 7,995,425 B2 | 8/2011 | Schreck et al. |
| 8,004,785 B1 | 8/2011 | Tsai et al. |
| 8,006,027 B1 | 8/2011 | Stevens et al. |
| 8,014,094 B1 | 9/2011 | Jin |
| 8,014,977 B1 | 9/2011 | Masiewicz et al. |
| 8,019,914 B1 | 9/2011 | Vasquez et al. |
| 8,040,625 B1 | 10/2011 | Boyle et al. |
| 8,059,357 B1 | 11/2011 | Knigge et al. |
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |
| 8,089,719 B1 | 1/2012 | Dakroub |

(56) References Cited

U.S. PATENT DOCUMENTS

| | | |
|---|---|---|
| 8,090,902 B1 | 1/2012 | Bennett et al. |
| 8,090,906 B1 | 1/2012 | Blaha et al. |
| 8,091,112 B1 | 1/2012 | Elliott et al. |
| 8,094,396 B1 | 1/2012 | Zhang et al. |
| 8,094,401 B1 | 1/2012 | Peng et al. |
| 8,116,020 B1 | 2/2012 | Lee |
| 8,116,025 B1 | 2/2012 | Chan et al. |
| 8,134,793 B1 | 3/2012 | Vasquez et al. |
| 8,134,798 B1 | 3/2012 | Thelin et al. |
| 8,139,301 B1 | 3/2012 | Li et al. |
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |
| 8,174,780 B1 | 5/2012 | Tsai et al. |
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |
| 8,289,656 B1 | 10/2012 | Huber |
| 8,300,338 B1 | 10/2012 | McFadyen |
| 8,305,705 B1 | 11/2012 | Roohr |
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,320,069 B1 | 11/2012 | Knigge et al. |
| 8,324,974 B1 | 12/2012 | Bennett |
| 8,332,695 B2 | 12/2012 | Dalphy et al. |
| 8,339,919 B1 | 12/2012 | Lee |
| 8,341,337 B1 | 12/2012 | Ong et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | DeForest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,770 B1 | 4/2013 | O'Dell et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,441,909 B1 | 5/2013 | Thayamballi et al. |
| 8,456,980 B1 | 6/2013 | Thayamballi |
| 8,458,526 B2 | 6/2013 | Dalphy et al. |
| 8,462,466 B2 | 6/2013 | Huber |
| 8,467,151 B1 | 6/2013 | Huber |
| 8,483,027 B1 | 7/2013 | Mak et al. |
| 8,489,841 B1 | 7/2013 | Strecke et al. |
| 8,493,679 B1 | 7/2013 | Boguslawski et al. |
| 8,499,198 B1 | 7/2013 | Messenger et al. |
| 8,514,506 B1 | 8/2013 | Li et al. |
| 8,554,741 B1 | 10/2013 | Malina |
| 8,560,759 B1 | 10/2013 | Boyle et al. |
| 8,576,509 B1 | 11/2013 | Hogg |
| 8,576,511 B1 | 11/2013 | Coker et al. |
| 8,578,100 B1 | 11/2013 | Huynh et al. |
| 8,578,242 B1 | 11/2013 | Burton et al. |
| 8,582,223 B1 | 11/2013 | Garani et al. |
| 8,582,231 B1 | 11/2013 | Kermiche et al. |
| 8,589,773 B1 | 11/2013 | Wang et al. |
| 8,593,753 B1 | 11/2013 | Anderson |
| 8,599,512 B2 | 12/2013 | Hogg |
| 8,605,379 B1 | 12/2013 | Sun |
| 8,611,031 B1 | 12/2013 | Tan et al. |
| 8,611,032 B2 | 12/2013 | Champion et al. |
| 8,612,798 B1 | 12/2013 | Tsai |
| 8,619,383 B1 | 12/2013 | Jung et al. |
| 8,619,508 B1 | 12/2013 | Krichevsky et al. |
| 8,619,529 B1 | 12/2013 | Liew et al. |
| 8,621,115 B1 | 12/2013 | Bombet et al. |
| 8,621,133 B1 | 12/2013 | Boyle |
| 8,625,224 B1 | 1/2014 | Lin et al. |
| 8,625,225 B1 | 1/2014 | Wang |
| 8,626,463 B2 | 1/2014 | Stevens et al. |
| 8,630,052 B1 | 1/2014 | Jung et al. |
| 8,631,188 B1 | 1/2014 | Heath et al. |
| 8,635,412 B1 | 1/2014 | Wilshire |
| 8,661,193 B1 | 2/2014 | Cobos et al. |
| 8,665,547 B1 | 3/2014 | Yeo et al. |
| 8,667,248 B1 | 3/2014 | Neppalli |
| 8,670,205 B1 | 3/2014 | Malina et al. |
| 8,671,250 B2 | 3/2014 | Lee |
| 8,681,442 B2 | 3/2014 | Hogg |
| 8,681,445 B1 | 3/2014 | Kermiche et al. |
| 8,683,295 B1 | 3/2014 | Syu et al. |
| 8,687,306 B1 | 4/2014 | Coker et al. |
| 8,687,307 B1 | 4/2014 | Patton |
| 8,687,313 B2 | 4/2014 | Selvaraj |
| 8,693,133 B1 | 4/2014 | Lee et al. |
| 8,698,492 B1 | 4/2014 | Mak et al. |
| 8,699,171 B1 | 4/2014 | Boyle |
| 8,699,172 B1 | 4/2014 | Gunderson et al. |
| 8,711,500 B1 | 4/2014 | Fong et al. |
| 8,711,506 B1 | 4/2014 | Giovenzana et al. |
| 8,711,665 B1 | 4/2014 | Abdul Hamid |
| 8,717,694 B1 | 5/2014 | Liew et al. |
| 8,717,695 B1 | 5/2014 | Lin et al. |
| 8,730,612 B1 | 5/2014 | Haralson |
| 8,743,502 B1 | 6/2014 | Bonke et al. |
| 8,749,911 B1 | 6/2014 | Sun et al. |
| 2006/0092550 A1 | 5/2006 | Ishii et al. |
| 2007/0268615 A1 | 11/2007 | McFadyen et al. |
| 2008/0130130 A1* | 6/2008 | Dieron et al. .............. 360/75 |
| 2009/0113702 A1 | 5/2009 | Hogg |
| 2010/0306551 A1 | 12/2010 | Meyer et al. |
| 2011/0226729 A1 | 9/2011 | Hogg |
| 2012/0159042 A1 | 6/2012 | Lott et al. |
| 2012/0275050 A1 | 11/2012 | Wilson et al. |
| 2012/0281963 A1 | 11/2012 | Krapf et al. |
| 2012/0324980 A1 | 12/2012 | Nguyen et al. |

OTHER PUBLICATIONS

Thomas A. O'Dell, et al. U.S. Appl. No. 13/225,309, filed Sep. 2, 2011, 16 pages.
Galvin T. Chia, et al. U.S. Appl. No. 13/158,087, filed Jun. 10, 2011, 19 pages.
Kent D. Anderson, et al. U.S. Appl. No. 13/157,809, filed Jun. 10, 2011, 22 pages.
Phillip S. Haralson, et al. U.S. Appl. No. 13/840,225, filed Mar. 15, 2013, 19 pages.

* cited by examiner

PER WEDGE PREHEAT DFH TO IMPROVE DATA STORAGE DEVICE PERFORMANCE

BACKGROUND

Disk drives comprise a disk and a head connected to a distal end of an actuator arm that is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the velocity of the actuator arm as it seeks from track to track.

Figure 1:
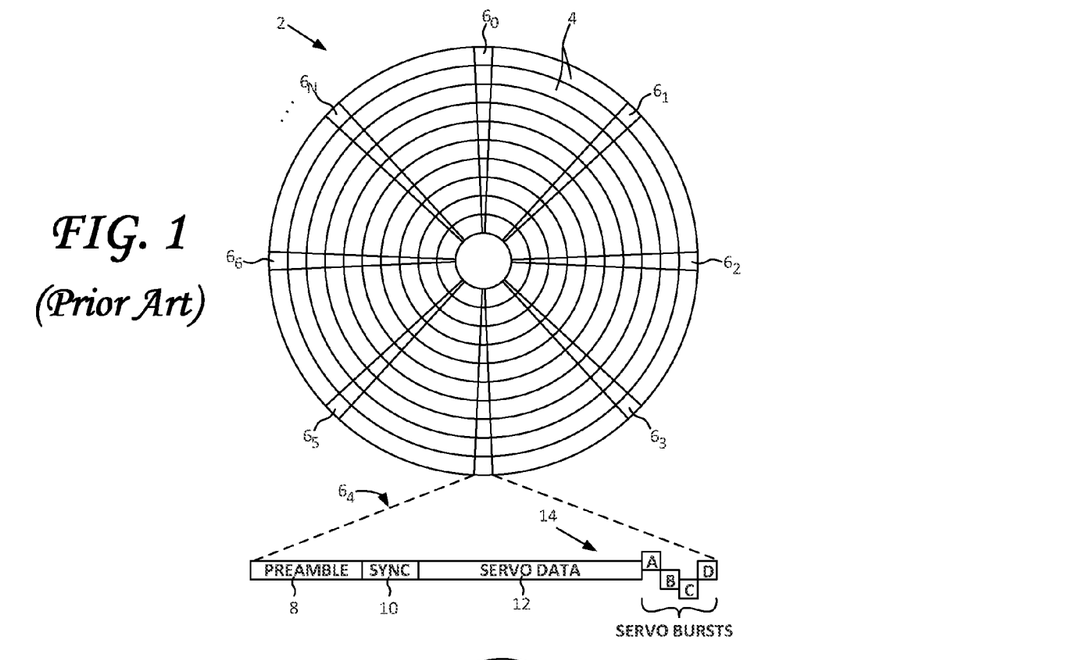
FIG. 1 is a representation of a conventional disk format.

Because the disk is rotated at a constant angular velocity, the data rate is typically increased toward the outer diameter tracks (where the surface of the disk is spinning faster) in order to achieve a more constant linear bit density across the radius of the disk. To simplify design considerations, the data tracks are typically banded together into a number of physical zones, wherein the data rate is constant across a zone, and increased from the inner diameter zones to the outer diameter zones. This is illustrated in FIG. 1, which shows a disk format 2 comprising a number of data tracks 4. The disk format of FIG. 1 also comprises a number of servo sectors $6_0$-$6_N$ recorded around the circumference of each data track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a track address, used to position the head over a target data track during a seek operation. Each servo sector $6_i$ further comprises groups of servo bursts 14 (e.g., A, B, C and D bursts), which comprise a number of consecutive transitions recorded at precise intervals and offsets with respect to a data track centerline. The groups of servo bursts 14 provide fine head position information used for centerline tracking while accessing a data track during write and read operations.

DETAILED DESCRIPTION

Figure 2:
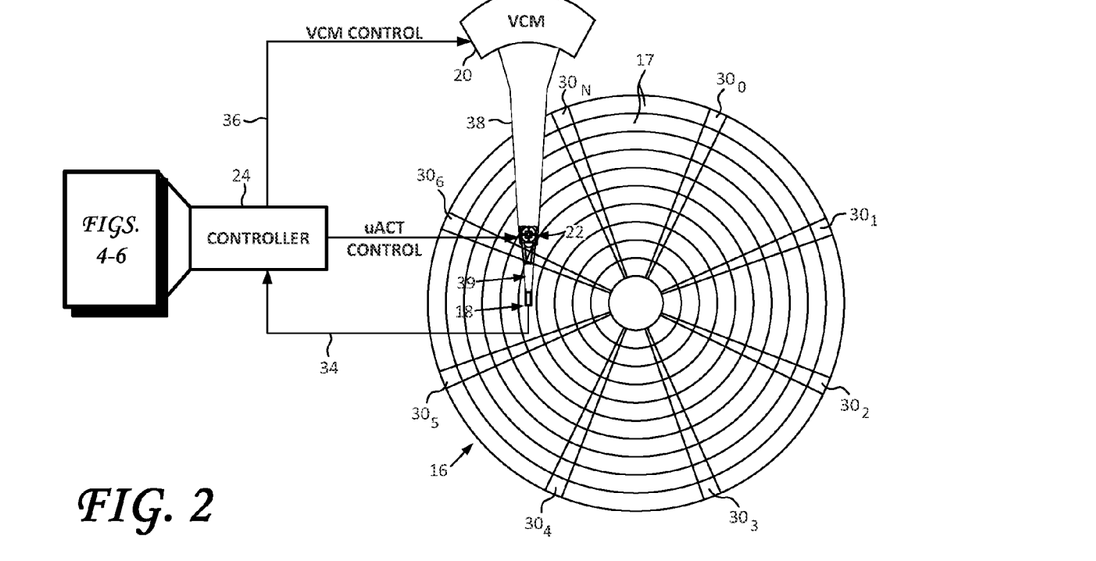
FIG. 2 is a diagram illustrating aspects of one embodiment.

FIG. 2 shows a disk drive configured to apply an initial amount of power to a DFH heater and decrease the amount of power applied to the DFH heater until a predetermined height of the head over the track is reached, according to one embodiment. As shown, the disk drive may comprise a disk 16 comprising a plurality of tracks 17, a head 18, a voice coil motor (VCM) 20 and a microactuator 22 for actuating the head 18 over the disk 16. The disk drive further comprises a controller 24 configured to execute a method according to one embodiment as shown, for example, in FIG. 5, among its other disk-controlling duties. As shown, the disk 16 comprises a plurality of servo sectors $30_0$-$30_N$ that define the plurality of tracks 17. The controller 24 processes read signal 34 to demodulate the servo sectors $30_0$-$30_N$ into a position error signal (PES). The PES is filtered with a suitable compensation filter to generate a control signal 36 that is applied to VCM 20, which rotates an actuator arm 38 about a pivot in order to position the head 18 radially over the disk 16 in a direction that reduces the PES. The servo sectors $30_0$-$30_N$ may comprise any suitable position information, such as a track address for coarse positioning and servo bursts for fine positioning.

According to one embodiment, any suitable microactuator 22 may be employed, such as a piezoelectric (PZT) actuator that transduces electrical energy into a mechanical displacement. In the embodiment of FIG. 2, the microactuator 22 is integrated with and actuates a suspension 39 that couples the head 18 to the actuator arm 38. However, the microactuator 22 may be integrated at any suitable location, such as with a slider to which the head 18 is mounted. In addition, the microactuator 22 may comprise multiple actuators (e.g., multiple PZTs) that may cooperate to move the head 18 in different radial directions. The controller 24 may be configured to perform the methods and functionality described herein, with particular reference to FIGS. 4-5.

In operation, an air bearing forms between the head and the disk due to the disk rotating at high speeds. Since the quality of the write/read signal depends at least in part on the fly height of the head, conventional heads (e.g., a magnetoresistive heads) may comprise a heater that controls the fly height through thermal expansion.

Figure 3:
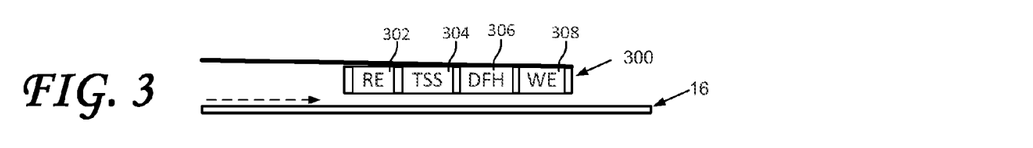
FIG. 3 shows a head according to one embodiment, comprising a dynamic fly height (DFH) actuator and a temperature sensitive fly height sensor (TSS).

FIG. 3 shows a head 300 according to one embodiment. The head 300 comprises a DFH heater 306 that is operable to actuate the head 300 vertically over the disk 16. The head 300 may further comprise a temperature sensitive fly height sensor (TSS) 304 operable to generate a fly height signal (FHS) representing a fly height of the head 300 over the disk 16. The disk drive may further comprise control circuitry operable to execute the flow diagram of FIG. 5, to control the fly height of the head 300 as described herein and as shown, for example in FIG. 4. A conversion function may be configured to convert the FHS expressed in first units (e.g., volts) into a corresponding fly height (FH) of the head 300 expressed in second units (e.g., nm). The DFH 306 may comprise any suitable actuator, such as a heater that actuates through thermal expansion, or a piezoelectric actuator that actuates through mechanical deflection. As also shown in FIG. 3, the head 300 comprises a suitable write element 28, such as an inductive coil, and a suitable read element 302, such as a magnetoresistive element. In one embodiment, the aforementioned control circuitry calibrates a DC control signal applied to the DFH 306 in order to maintain the head 300 at a desired fly height during write/read operations (where a different target fly height may be used for write and read operations). The topography of the disk 16 may vary for any number of reasons, including a warpage of the disk 16 caused by an uneven clamping force when clamping the disk 16 to a spindle motor that rotates the disk 16. In one embodiment, the DC control signal applied to the DFH 306 may be modulated by an AC control signal so that the head 300 follows the topography of the disk 16 during write/read operations and to selectively implement the fly height profiles described herein, representative exemplars of which are shown in FIGS. 4 and 5.

Upon receipt of a write command, the disk drive may apply a constant amount of power to the DFH heater to lower the head 300 to a predetermined write height over the disk 16, as the disk 16 rotates under the head 300. As the constant amount of power is applied to the DFH heater 306, the head takes a predetermined amount of time to transition from an initial track following fly height to a fly height that is suitable for the write element 308 to write to the disk 16. This fly height may be determined, for example, during pre-manufacturing activities. This predetermined amount of time may be calculated for the track and target location on the disk 16 on which the write operation is to be carried out. However, if the drive determined that target location will appear below the head 300 before the head 300 is flying at the correct fly height for the write element 308 to write to the target location, the disk drive must resort to waiting for another revolution of the disk 16 for the target location to come under the head 300. This calculation may be made, for example, by measuring the wedge-to-wedge time between successive wedges as the disk 16 rotates under the head 300. It may be appreciated that since the head 300 takes a finite period of time to transition from an initial fly height to a fly height suitable for write operations, there is conventionally a minimum period of time from application of the constant power to the DFH heater 306 to the time at which the TSS 304 generates a signal that is representative of the head 300 flying at the correct height to carry out the write operation. Such minimum period of time may, for example, be measured in servo sector wedges. Conventionally, if the drives determines that target location would appear under the head 300 sooner that that minimum period of time or minimum number of servo sector wedges, the disk drive will have to allow the disk 16 to complete another revolution to enable the head 300 to be lowered to its predetermined fly height in a timely manner though the application of a constant amount of power. For example, conventionally, it may take a period of time roughly equivalent to the time necessary for 40 wedges to pass under the head 300 as the disk 16 rotates thereunder.

According to one embodiment, however, that minimum period of time or number of wedges may be shortened or decreased, respectively. According to one embodiment, if this minimum period of time is shortened or number of wedges decreased, the disk drive may exhibit less latency, as the head 300 may be positioned at a fly height suitable for writing sooner than it would otherwise be.

Figure 4:
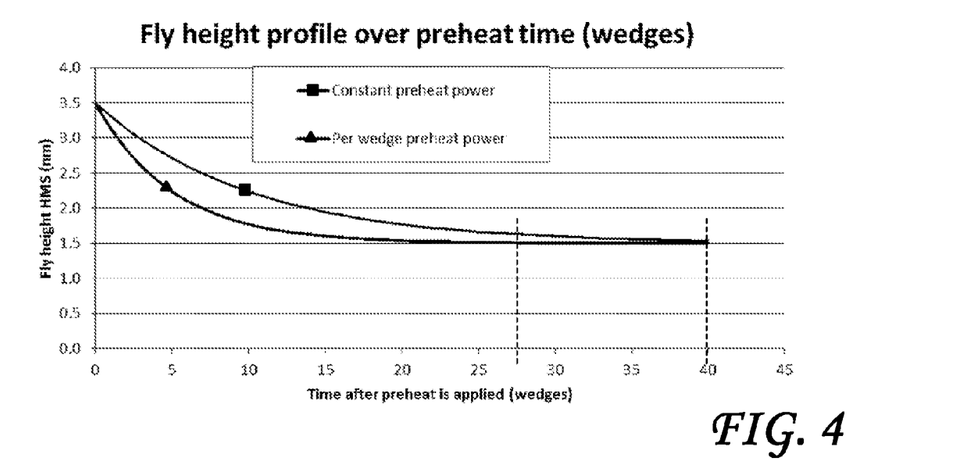
FIG. 4 is a chart illustrating exemplary fly height profile over time, illustrating aspects of one embodiment.
Figure 5:
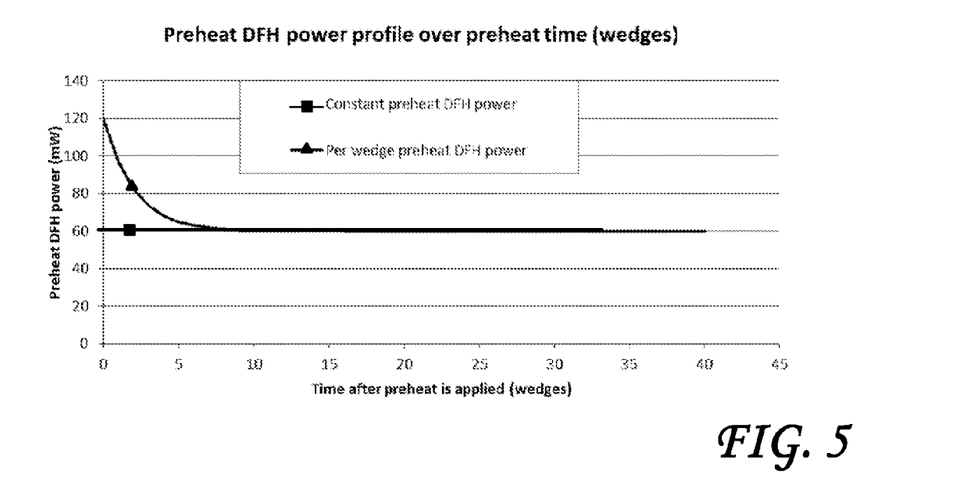
FIG. 5 is a chart illustrating exemplary DFH power profile over time, illustrating further aspects of one embodiment.

FIG. 4 is a chart illustrating a fly height profile over time, illustrating aspects of one embodiment. FIG. 5 is a chart illustrating a DFH power profile over time, illustrating further aspects of one embodiment. The chart of FIG. 4 plots the fly height of the head over the rotating disk as a function of time (measured in servo wedges here), for both the constant power level conventionally applied to the DFH heater 306 and an amount of power to the DFH heater 306 that is dependent at least in part on the determined number of servo sectors or determined period of time. The power profile according to one embodiment is not constant, as shown by the "per wedge preheat DFH power" curve of FIG. 5. This initial application of power (e.g., 120 mW as shown in FIG. 5) may be higher than it would otherwise be had the applied power been maintained at the conventional constant level (e.g., 60 mW as shown in FIG. 5). According to one embodiment, this initial, higher application of power to the DFH heater may be decreased until a target power is reached. According to one embodiment, at or around that target power, the head (and/or the write element 308) reaches a height over the track of the rotating disk at which the head 300 is operative to perform data access operations, including write operations.

This height over the track may be reached, according to one embodiment, earlier (or in fewer servo wedges) than it otherwise would had a constant power level have been applied to the DFH heater. As shown in exemplary FIG. 4, from an initial, track following height of 3.5 nm, a predetermined height of 1.5 nm at which data access operations may be carried out is achieved after about 40 wedges have passed under the head when the conventional constant power level is applied to the DFH heater and is achieved, in the exemplary embodiment of FIG. 4, after only about 23 wedges have passed under the head. This time savings of time in reaching the height of 1.5 nm at which data access operations may be carried out may result in better drive performance characteristics, such as lower average seek times.

According to one embodiment, the head 300 may be positioned over one of the tracks of the disk 16. Such track may be the track containing the target location at which a command is to be initiated. The controller 24 may then determine the number of servo sectors $30_N$ to pass under the head 300 before the target location over the track is reached by the head 300. Alternatively, the controller 24 may be configured to determine the period of time before the head 300 passes over the target location over the track. Thereafter, according to one embodiment, the controller 24 may apply an initial amount of power to the DFH heater 306 that is dependent at least in part on the determined number of servo sectors or determined period of time. In this manner, a lower wedge count (or shorter period of time) until the target location may be correlated, according to one embodiment, with a higher initially-applied power to the DFH heater 306. Conversely, a higher wedge count (or longer period of time) until the target location may be correlated, according to one embodiment, with a comparatively lower initially-applied power to the DFH heater 306. This initially-applied power may be changed (e.g., decreased) after each or a selected number of servo sectors pass under the head 300. Alternatively, a determination or calculation may be made after each or a selected number of servo sectors pass under the head 300, to determine whether to maintain the current level of applied power or whether the applied power should be changed (e.g., decreased). The decrease itself, according to one embodiment, need not be constant. Indeed, the rate at which the applied power is decreased may itself change over time.

Thereafter, the controller 24 may cause the amount of power applied to the DFH heater 306 to be decreased until a target power to the DFH heater 306 is reached, which target power may be correlated with a predetermined height over the track or with a height at which certain data access operations (such as write operations) may be carried out. According to one embodiment, this height may be the height at which the head 300 may carry out write operations using the write element 308. Also according to one embodiment, the initial power applied to the DFH heater 306 may be higher than it would otherwise be had the applied power been constant. The control of the decrease of the initially-applied amount of power to the DFH heater, according to one embodiment, may be carried out in an open loop fashion. According to one embodiment, however, the control of the decrease of the initially-applied amount of power to the DFH heater may be carried out in a closed-loop fashion. That is, according to one embodiment, the decrease of the initially-applied amount of power to the DFH heater may be continued until a monitored, calculated or otherwise derived height of the head 300 over the track is reached.

According to one embodiment, the initially-applied amount of power may be selected to be, for example, between about 10% and about 100% greater than the constant amount of power conventionally applied to the DFH heater. FIG. 5 shows an example in which the initially-applied power according to one embodiment may be higher (e.g., 120 mW) than the conventionally-applied constant power level (e.g., 60 mW). As shown in FIG. 5, this initial higher power level applied to the DFH heater may then be decreased until a predetermined or target power is reached, which target power may be associated with a height of the head over the track that is suitable for read and/or write operations. In this manner, the head 300 may be disposed at or near the desired height when the head 300 passes over the target location 410 (at which write operations are to be initiated, for example). As shown in FIG. 5, the initially-applied power (or applied at any point in the DFH heater power profile of FIG. 5) may be decreased in a monotonic manner. The decrease may be carried out using any suitable profile. For example, the applied power may be continuously (or continuously decreased in a stepwise manner at the minimum control resolution) decreased or the applied power may be decreased in a piece-wise linear manner. The timings of the successive decreases in applied power may be varied at will, as they need not be regular. The DFH heater power profile or profiles may be predetermined and stored in a non-volatile memory and/or may be calculated on the fly. The stepped decreases in power applied to the DFH heater may be timed according to detected wedge boundaries, for example. According to one embodiment, the combination of higher initially applied power and decreases in applied power may be configured such that the head does not overshoot the targeted fly height. This ensures both correct write operations and prevents the head 300 from contacting the surface of the disk 16 or dipping below an optimal height over the rotating disk.

Figure 6:
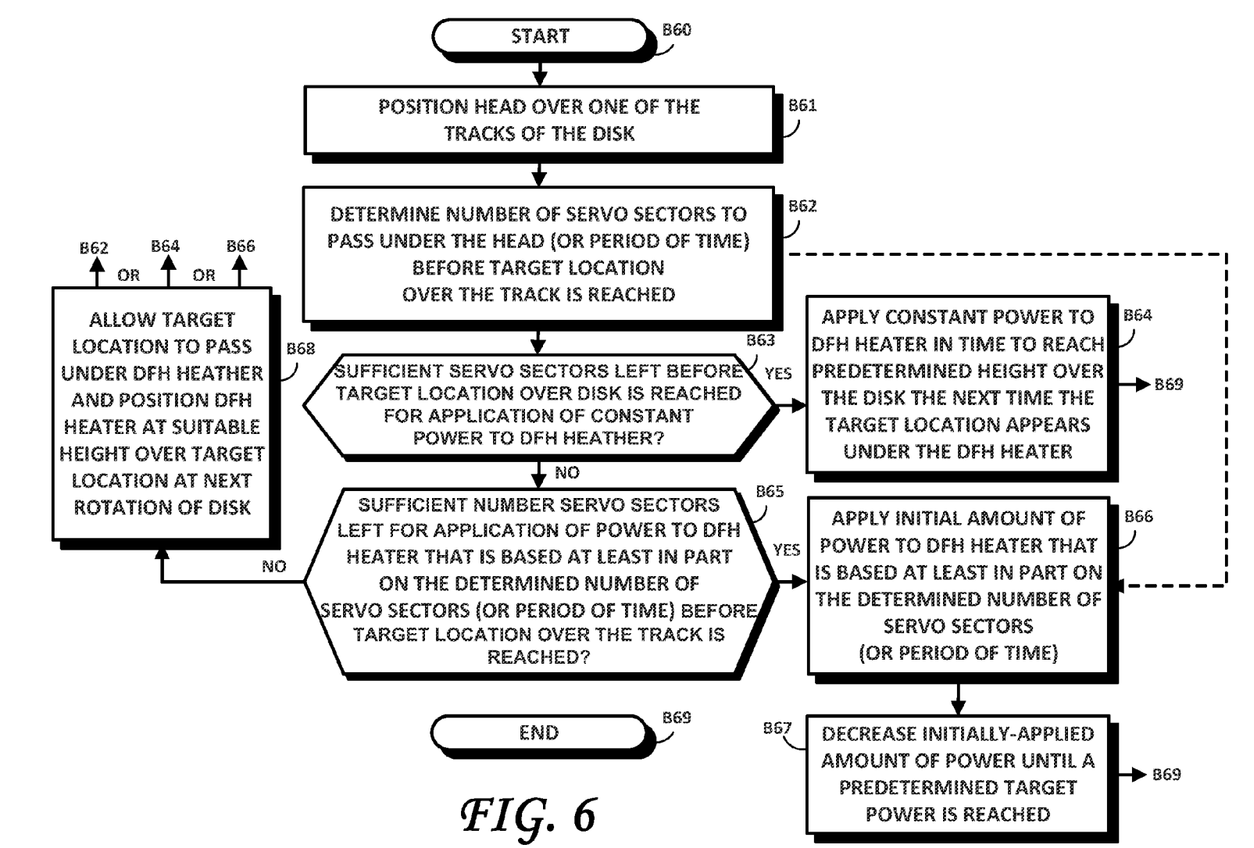
FIG. 6 is a flowchart of a method according to one embodiment.

FIG. 6 is a flowchart of a method according to one embodiment. As shown therein, the method starts at B60 and block B61 calls for positioning the head 300 over one of the tracks of the disk. Thereafter, the number of servo sectors to pass under the head (or period of time) before the target location over the track is reached may be determined, as shown at B62. According to one embodiment, block B66 may then be carried out, as indicated by the dashed arrow line between B62 and B66. B66 calls for applying an amount of power to the DFH heater that is based at least in part on the number of servo sectors (or period of time) that was determined in block B62. As noted above, that initial application of power may be higher than it would otherwise be had the applied power been maintained at a constant level. Lastly, block B67 calls for the power applied to the head 300 to be decreased until a target power level is applied to the DFH heater. At or around that time, in some situations, the head 300 should be flying at a height above the track containing the target location that is suitable for read and/or write operations. In some situations, such as when greater power is applied or power is applied earlier, the head 300 may reach the target height well before the target location.

According to one embodiment, after block B62, block B63 may be carried out. In block B63, the disk drive may determine whether a sufficient number of servo sectors or wedges are yet to pass under the head 300 that would allow sufficient time for the application of constant power to the DFH heater in time for the head 300 to reach the predetermined height over the target location by the next time the target location passes under the disk (i.e., without waiting for an additional rotation of the disk). If YES, the method may proceed to previously described block B64. If, however, there are an insufficient number of servo sectors or wedges yet to pass under the head 300 such that there is insufficient time for the application of constant power to the DFH heater (NO branch of B63), the method may proceed to B65.

In B65, it may be determined whether there are a sufficient number of servo sectors or wedges for carrying out B66 and B67 in time for the target power to be reached by the next time the target location passes under the heads 300. If YES, then the method may proceed to previously-described Blocks B66 and B67. If there are an insufficient number of servo sectors or wedges that are yet to pass before the target power to the DFH heater is reached (NO branch of B65), the method may proceed to B68. In B68, the target location may be allowed to pass under the head 300 without attempting to lower the head to a height suitable for read/write operations and the method may proceed to B62. B68, effectively, allows the disk to rotate another rotation, at which point there should be sufficient time before the target location again appears to apply the constant power to the DFH heater, as shown at B64. Alternatively, blocks B66 and B67 may be carried out after the target location passes under the head 300 and the disk rotates another rotation. The method ends after either block B69 or B67. Alternatively, the method may revert back to B61, where the head may be positioned over the same or over another track for access to another target location on the disk. In this manner, the controller 24 may be configured to selectively apply the constant power $W_K$ or a relatively higher power level (e.g., between about 10% and about 100% of the constant power $W_K$), followed by successive decreases thereof until the target height over the disk is achieved. Alternately still, the controller 24 may be configured to only apply the higher power level and decrease the applied power until the target power to the DHF heater is reached, irrespective of period of time available or the number of wedges to pass under the head until the target location is reached.

While certain embodiments of the disclosure have been described, these embodiments have been presented by way of example only, and are not intended to limit the scope of the disclosure. Indeed, the novel methods, devices and systems described herein may be embodied in a variety of other forms. Furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure. For example, those skilled in the art will appreciate that in various embodiments, the actual physical and logical structures may differ from those shown in the figures. Depending on the embodiment, certain steps described in the example above may be removed, others may be added. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure.

The invention claimed is:

1. A data storage device comprising:
    a disk comprising a plurality of tracks, each track comprising a plurality of data sectors and a plurality of servo sectors;
    a spindle motor for rotating the disk;
    a had actuated radially over the disk, the head comprising a dynamic fly height (DFH heater; and
    control circuitry configured to:
        position the head over one of the tracks;
        determine a number of servo sectors to pass under the head before a target location over the track is reached;
        apply an initial amount of power to the DFH heater that is dependent at least m part on the determined number of servo sectors; and decrease the initially-applied amount of power before the target location comes under the head until a predetermined target power is reached.

2. The data storage device of claim 1, wherein the initially-applied amount of power is greater than a constant amount of power necessary for the bead to reach the target location at a predetermined height without decreasing the applied power.

3. The data storage device of claim 2, wherein the initially-applied amount of power is between about 10% and about 100% greater than the constant amount of power.

4. The data storage device of claim 1, wherein the control circuitry is further configured to decrease the power applied to the DFH heater after each of the determined number of servo sectors passes under the head.

5. The data storage device of claim 1, wherein the power applied to the DFH heater is maintained substantially constant during at least a portion of a time between next adjacent servo sectors pass under the head.

6. A method of operating a data storage device, the disk drive comprising a disk comprising a plurality of tracks, each track comprising a plurality of data sectors and a plurality of servo sectors, a spindle motor for rotating the disk, and a head actuated radially over the disk, the head comprising a dynamic fly height (DFH) heater, the method comprising:
  positioning the head over one of the tracks;
  determining a number of servo sectors to pass under the head before a target location over the track is reached;
  applying an initial amount of power to the DFH heater that is based at least in part on the determined number of servo sectors; and
  decreasing the initially-applied amount of power applied to the DFH heater before the target location comes under the head until a predetermined target power is reached.

7. The method of claim 6, wherein the initially-applied amount of power is greater than a constant amount of power necessary for the head to reach the target location at a predetermined height without decreasing the applied power.

8. The method of claim 7, wherein the initially-applied amount of power is between about 10% and about 100% greater than the constant amount of power.

9. The method of claim 6, wherein decreasing decreases the power applied to the DFH heater monotonically.

10. The method of claim 6, further comprising maintaining the power applied to the DFH heater substantially constant during, at least a portion of a time between next adjacent servo sectors pass under the head.

11. A data storage device comprising:
  a disk comprising a plurality of tracks, each track comprising a plurality of data sectors and a plurality of servo sectors;
  a spindle motor for rotating the disk;
  a head actuated radially over the disk the head comprising a dynamic fly height (DFH) heater; and
  control circuitry configured to:
    position the head over a given one of the tracks;
    determine a period of time before the head reaches a target location over the given track;
    apply an initial amount of power, while the head is over the given track, to the DFH heater that is dependent at least in part on the determined period of time, the initially-applied amount of power being an amount of power of a plurality of amounts of power that are each dependent upon an amount of time before the head reaches a tartlet location on a track being followed; and
    decrease, while the head is over the given track, the initially-applied amount of power applied to the DFH heater during the period of time until a predetermined target power is reached, the predetermined target power being associated with a height, of the head over the given track, that is suitable for read and/or write operations.

12. The disk drive of claim 11, wherein the control circuitry is further configured to determine the period of time by at least measuring a wedge-to-wedge time between two of the servo sectors.

13. A method, comprising:
  providing a disk drive, the disk drive comprising a disk comprising a plurality of tracks, each track comprising a plurality of data sectors and a plurality of servo sectors, a spindle motor for rotating the disk, and a head actuated radially over the disk, the head comprising a dynamic fly height (DFH) heater;
  positioning the head over a then one of the tracks;
  determining a period of time before the head reaches a target location on the given track;
  applying, while the bead is over the given track an initial amount of to the DFH heater that is dependent at least in part on the determined period of time, the initially-applied amount of power being an amount of power of a plurality of amounts of power that are each dependent upon an amount of time before the head reaches a target location on a track being followed; and
  decreasing, while the head is over the given track, the initially-applied amount of power applied to the DFH heater doting the period of time until a predetermined target power reached, the predetermined target power being associated with a height of the head over the given track that is suitable for read and/or write operations.

14. The method of claim 13, wherein determining the period of time comprises at least measuring a wedge-to-wedge time between two of the servo sectors.

15. A data storage device comprising:
  a disk comprising a plurality of tracks, each track comprising a plurality of data sectors and a plurality of servo sectors;
  a spindle motor for rotating the disk;
  a head actuated radially over the disk, the head comprising a dynamic fly height (DFH) heater; and
  control circuitry configured to:
    position the head over one of the tracks;
    determine a number of servo sectors to pass under the head before a target location over the track is reached;
    apply an initial amount of power to the DFH heater that is dependent at least in part on the determined number of servo sectors; and
    before the target location comes under the head, decrease the initially-applied amount of power after each or the determined number of servo sectors, until a predetermined target power is reached.

16. A method of operating a data storage device, the data storage device comprising a disk comprising a plurality of tracks, each track comprising a plurality of data sectors and a plurality of servo sectors, a spindle motor for rotating the disk, and a head actuated radially over the disk, the head comprising a dynamic fly height (DFH) heater, the method comprising:
  positioning the head over one of the tracks;
  determining a number of servo sectors to pass under the head before a target location over the track is reached;
  applying an initial amount of power to the DFH heater that is based at least in part on the determined number of servo sectors; and before the target location comes under the head and until a predetermined target power is reached, decreasing the initially-applied amount of power applied to the DFH heater after each or the determined number of servo sectors passes under the head.

\* \* \* \* \*